(12) United States Patent
Sato

(10) Patent No.: US 10,656,664 B1
(45) Date of Patent: May 19, 2020

(54) VOLTAGE GENERATOR

(71) Applicant: Winbond Electronics Corp., Taichung (TW)

(72) Inventor: Takahiko Sato, Kanagawa (JP)

(73) Assignee: Winbond Electronics Corp., Taichung (TW)

( * ) Notice: Subject to any disclaimer, the term of this patent is extended or adjusted under 35 U.S.C. 154(b) by 0 days.

(21) Appl. No.: 16/574,097

(22) Filed: Sep. 18, 2019

(30) Foreign Application Priority Data

Mar. 13, 2019 (JP) ................................. 2019-046266

(51) Int. Cl.
| G05F 1/00 | (2006.01) |
| G05F 1/575 | (2006.01) |
| H02M 3/07 | (2006.01) |
| H02M 7/10 | (2006.01) |
| H02M 1/088 | (2006.01) |

(52) U.S. Cl.
CPC ............ *G05F 1/575* (2013.01); *H02M 1/088* (2013.01); *H02M 3/07* (2013.01); *H02M 7/10* (2013.01)

(58) Field of Classification Search
CPC .......... H02M 3/07; H02M 3/073; H02M 7/10; H02M 7/103; H02M 7/106; H02M 1/088; G05F 1/575
See application file for complete search history.

(56) References Cited

U.S. PATENT DOCUMENTS

2006/0108993 A1* 5/2006 Chien ..................... G05F 1/565
323/282
2016/0349776 A1 12/2016 Conte et al.

FOREIGN PATENT DOCUMENTS

| CN | 101404448 | 5/2011 |
| CN | 102650893 | 8/2012 |
| CN | 203733021 | 7/2014 |
| CN | 105474118 | 4/2016 |
| CN | 106325344 | 1/2018 |
| TW | 200838111 | 9/2008 |
| TW | 201243535 | 11/2012 |
| TW | 201250424 | 12/2012 |
| TW | 201539170 | 10/2015 |

(Continued)

OTHER PUBLICATIONS

"Office Action of Taiwan Counterpart Application," dated Sep. 24, 2019, p. 1-p. 4.

*Primary Examiner* — Adolf D Berhane
*Assistant Examiner* — Afework S Demisse
(74) *Attorney, Agent, or Firm* — JCIPRNET

(57) ABSTRACT

The disclosure provides a voltage generator including a first voltage regulator which provides an output voltage to an output terminal according to a reference voltage; a second voltage regulator which determines whether to operate in an enable mode or a disable mode according to an enable signal and provides the output voltage to the output terminal according to the reference voltage when operating in the enable mode; an initial voltage generator which sets a feedback voltage of the second voltage regulator to be an initial voltage value close to the reference voltage when the enable signal switches the second voltage regulator from the disable mode to the enable mode, such that the feedback voltage of the second voltage regulator is able to be locked to the reference voltage fast, and a settling time and an overshoot/undershoot of the output voltage are reduced.

10 Claims, 5 Drawing Sheets

(56) References Cited

FOREIGN PATENT DOCUMENTS

| | | |
|---|---|---|
| TW | 201626129 | 7/2016 |
| TW | 201832039 | 9/2018 |

\* cited by examiner

VOLTAGE GENERATOR

CROSS-REFERENCE TO RELATED APPLICATION

This application claims the priority benefit of Japan application serial no. 2019-046266, filed on Mar. 13, 2019. The entirety of the above-mentioned patent application is hereby incorporated by reference herein and made a part of this specification.

BACKGROUND

Technical Field

The disclosure relates to a voltage generator.

Description of Related Art

FIG. 5 shows a circuit diagram of a conventional voltage generator 500c. After a second voltage regulator 505c is switched from a disable mode to an enable mode using an enable signal ven, a feedback voltage vfb of the second voltage regulator 505c has to be re-locked to a reference voltage vref. A time tc of a certain length (known as a settling time) is required for the process of locking the feedback voltage vfb to the reference voltage vref, as shown in FIG. 6. This period of settling time will cause a load 506 to be unstable for a certain length of time, thereby affecting work performance.

SUMMARY

The disclosure provides a voltage generator capable of reducing a settling time of an output voltage and a magnitude of an overshoot/undershoot voltage.

An embodiment of the disclosure provides a voltage generator, including a first voltage regulator which provides an output voltage to an output terminal according to a reference voltage; a second voltage regulator which determines whether to operate in an enable mode or a disable mode according to an enable signal, the second voltage regulator provides the output voltage to the output terminal when operating in the enable mode, and the second voltage regulator includes an error amplifier which amplifies a difference between a feedback voltage based on the output voltage and the reference voltage when operating in the enable mode and outputs to the output voltage, a bleeder circuit which divides the output voltage to generate the feedback voltage, and an initial voltage generator which sets a voltage value of the feedback voltage to be at an initial voltage value during an initial time interval after the second voltage regulator switches from the disable mode to the enable mode according to the enable signal, and the initial voltage generator includes a first capacitor, a second capacitor, and a first resistor, wherein the first capacitor, the second capacitor, and the first resistor are connected in series between one terminal of the bleeder circuit and a ground terminal, and the initial voltage value is inversely proportional to a capacitance value of the first capacitor.

Another embodiment of the disclosure provides a voltage generator which includes a first capacitor, a second capacitor, a third capacitor, a first transistor, a second transistor, and a first resistor, wherein the second capacitor, the third capacitor, and the first resistor are connected in series between one terminal of the bleeder circuit and the ground terminal, the first transistor and the second transistor are controlled by the enable signal and couple one terminal of the first capacitor to the ground terminal or the bleeder circuit, and the initial voltage value is inversely proportional to the capacitance value of the first capacitor.

Based on the above, according to the voltage generator of the disclosure, the initial voltage value after the feedback voltage in the disable mode is switched to the enable mode may be close to the reference voltage, such that the process of locking the feedback voltage to the reference voltage has a shorter settling time and a smaller overshoot/undershoot voltage. Therefore, the output voltage may have a shorter settling time and a smaller overshoot/undershoot voltage when the voltage generator is switched from a low power consumption mode to a high power consumption mode.

DETAILED DESCRIPTION OF DISCLOSED EMBODIMENTS

Hereinafter, embodiments of the disclosure will be described with reference to the drawings.

Figure 1:
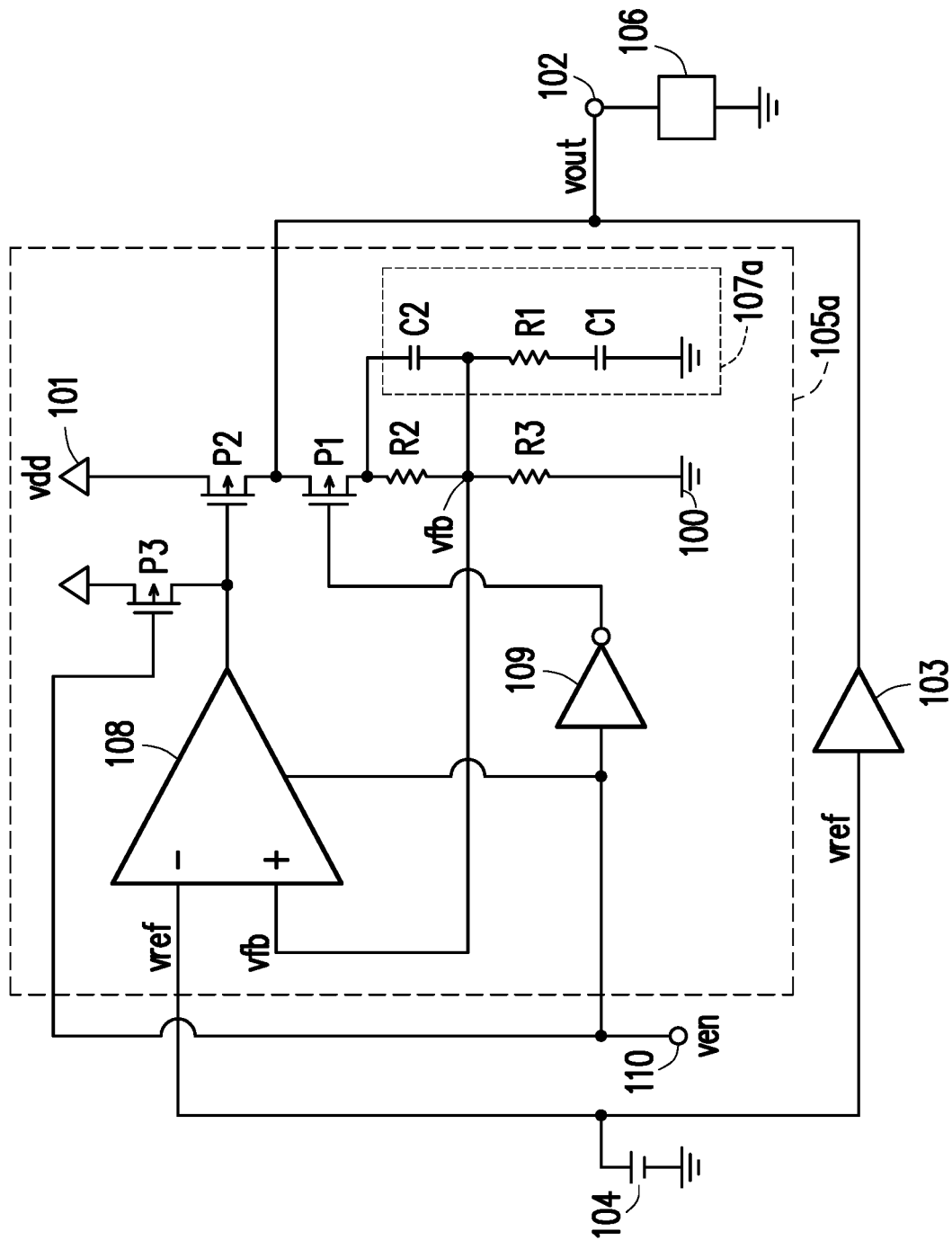
FIG. 1 is a circuit diagram showing a voltage generator according to the first embodiment of the disclosure.

FIG. 1 is a circuit diagram showing a voltage generator 100a according to the first embodiment of the disclosure.

The voltage generator 100a of the embodiment includes a ground terminal 100, a power source terminal 101, an output terminal 102, a first voltage regulator 103, a reference voltage source 104, and a second voltage regulator 105a, wherein the second voltage regulator 105a includes an initial voltage generator 107a, an error amplifier 108, an inverter 109, an enable signal input terminal 110, transistors P1, P2 and P3, a first resistor R1, a second resistor R2, a third resistor R3, a first capacitor C1, and a second capacitor C2.

The connection relationship of the above elements is as follows: one terminal of the reference voltage source 104 is connected to the inverting input terminal of the error amplifier 108 and the input terminal of the first voltage regulator 103, and the other terminal of the reference voltage source 104 is connected to the ground terminal 100; the enable terminal of the error amplifier 108, the control terminal of the transistor P3, and the input terminal of the inverter 109 are connected to the enable signal input terminal 110; one terminal of the transistor P3 and the control terminal of the transistor P2 are connected to the output terminal of the error amplifier 108; the other terminal of the transistors P3 and P2 are connected to the power source terminal 101; one terminal of the transistor P2, the other terminal of the transistor P1, and an output terminal of the first voltage regulator 103 are connected to the output terminal 102; the control terminal of transistor P1 is connected to the output terminal of inverter 109; one terminal of the third resistor R3 and the other terminal of the second resistor R2 are connected to the non-inverting input terminal of the error amplifier 108; the other terminal of the third resistor R3 is connected to the ground terminal 100; one terminal of the second resistor R2 and one terminal of the transistor P1 are connected to one terminal of the second capacitor C2; the other terminal of the second capacitor C2 and the other terminal of the second resistor R2 are connected to one terminal of the first resistor R1; the other terminal of the first resistor R1 is connected to one terminal of the first capacitor C1; the other terminal of the first capacitor C1 is connected to the ground terminal 100; one terminal of the load 106 is connected to the output terminal 102; the other terminal of the load 106 is connected to the ground terminal 100, the power source terminal 101 is connected to the power supply voltage vdd, and the ground terminal 100 is connected to the ground voltage.

Hereinafter, the operation of the voltage generator 100a configured as above will be described.

Figure 2:
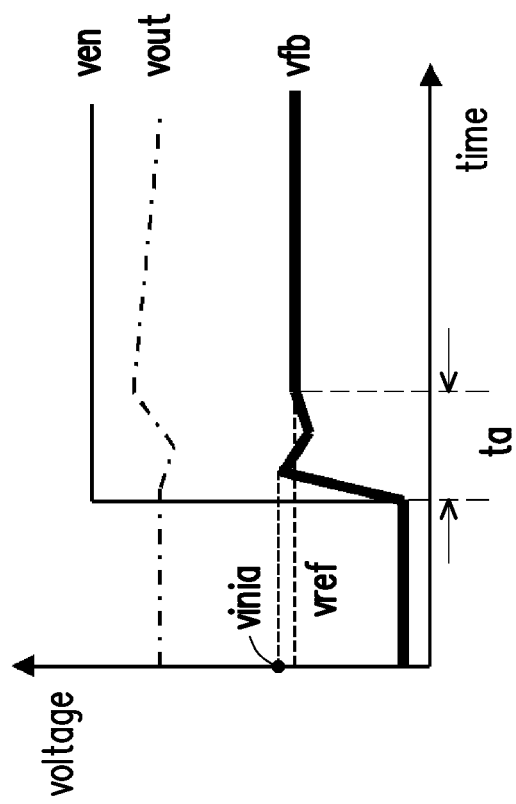
FIG. 2 is a time chart showing respective voltage signals of the voltage generator shown in FIG. 1.

Referring to FIG. 1 and FIG. 2, when the enable signal ven is at a second logic level, that is, the enable mode, the reference voltage vref generated by the first voltage regulator 103 and the second voltage regulator 105a of the voltage generator 100a according to the reference voltage source 104 provides an output voltage vout to the load 106 connected to the output terminal 102. In order to save power, when the load 106 is operated in a low power consumption mode, the voltage generator 100a may set to a first logic level using the enable signal ven while the second voltage regulator 105a is set to the disable mode, and only the first voltage regulator 103 provides the output voltage vout to the load 106. As such, the standby current of the second voltage regulator 105a may be saved to achieve power saving effect. When the load 106 is operated in a higher power consumption mode, the voltage generator 100a sets to the second logic level using the enable signal ven again to switch the second voltage regulator 105a from the disable mode to the enable mode, such that the first voltage regulator 103 and the second voltage regulator 105a simultaneously provide the output voltage vout to the load 106.

The first logic level may be a logic high level or a logic low level, and is not particularly limited. Moreover, the second logic level is a logic level complementary to the first logic level.

The voltage generator 100a sets the second voltage regulator 105a to the disable mode using the following method. Firstly, the error amplifier 108 is set to the disable mode, the transistor P3 is turned on, and the transistor P1 is turned off according to the enable signal ven as the first logic level, so that the transistor P2 is turned off due to the increase in the control terminal voltage. No current flows through the second resistor R2 and the third resistor R3 to complete the disable mode setting and achieve power saving effect. It should be noted that when the second voltage regulator 105a is in the disable mode, the first voltage regulator 103 still operates normally, that is, the first voltage regulator 103 still provides the output voltage vout to the load 106. However, at this time, since no current flows through the second resistor R2 and the third resistor R3, that is, the voltages across the third resistor R3 are equal, the feedback voltage vfb is equal to the ground voltage of the ground terminal 100 in the disable mode.

After the enabling signal ven is switched from the first logic level to the second logic level to switch the second voltage regulator 105a from the disable mode to the enable mode, the error amplifier 108 is enabled, the transistor P3 is turned off, and the transistor P1 is turned on, such that the error amplifier 108, the transistor P2, and components such as the first resistor R1, the second resistor R2, the third resistor R3, the first capacitor C1, the second capacitor C2 shown in FIG. 1 relock the feedback voltage vfb from the initial voltage value vinia to the reference voltage vref. A time to taken for the process from after the enable signal ven is switched from the first logic level to the second logic level to the feedback voltage vfb is locked to the reference voltage vref is known as the settling time, as shown in FIG. 2.

The initial voltage value vinia of the feedback voltage vfb will be analyzed below. When the enable signal ven is at the first logic level (i.e. the disable mode), the voltages across the first capacitor C1 and the second capacitor C2 of the initial voltage generator 107a are both equal to the ground voltage of the ground terminal 100. Therefore, no charge is stored in both the first capacitor C1 and the second capacitor C2 at this time. After the enable signal ven is switched from the first logic level to the second logic level, the transistor P1 is turned on. The charge injected into the initial voltage generator 107a via the transistor P1 is distributed to the first capacitor C1 and the second capacitor C2. The charge distribution relationship between the first capacitor C1 and the second capacitor C2 can be expressed by Equation (1) as below. It can be inferred from Equation (1) that the initial voltage value vinia of the feedback voltage vfb is inversely proportional to the capacitance value of the first capacitor C1 and proportional to the capacitance value of the second capacitor C2.

$$C2 \times (vfb - vout) + C1 \times vfb = 0 \quad (1)$$
$$\Rightarrow vfb = vinia = vout \times \frac{C2}{C2 + C1} = vout \times \frac{1}{1 + \frac{C1}{C2}}$$

In addition, it can also be known from Equation (1) that the capacitance values of the first capacitor C1 and the second capacitor C2 are designed such that the initial voltage value vinia of the feedback voltage vfb is close to the reference voltage vref to reduce the settling time and the overshoot/undershoot voltage of the process of locking the feedback voltage vfb to the reference voltage vref. For example, when the reference voltage vref=1 volt (V) and the output voltage vout=3V, the ratio of the capacitance values of the first capacitor C1 to the second capacitor C2 (C1/C2) may be designed to be substantially equal to 2.

After the enable signal ven is switched from the first logic level to the second logic level, if the initial voltage value vinia of the feedback voltage vfb is a voltage value slightly larger than the reference voltage vref, the error amplifier 108 amplifies the difference between the feedback voltage vfb and the reference voltage vref using the negative feedback design of the second voltage regulator 105a, such that the control terminal voltage of the transistor P2 rises, and the current flowing to the second resistor R2 and the third resistor R3 falls. Therefore, the feedback voltage vfb falls and is gradually locked to the reference voltage vref.

On the contrary, if the initial voltage value vinia of the feedback voltage vfb is a voltage value slightly smaller than the reference voltage vref, the error amplifier 108 amplifies the difference between the feedback voltage vfb and the reference voltage vref using the negative feedback design of the second voltage regulator 105a, such that the control terminal voltage of the transistor P2 falls, and the current flowing to the second resistor R2 and the third resistor R3 rises. Therefore, the feedback voltage vfb rises and is gradually locked to the reference voltage vref.

It is worth mentioning that other than determining the initial voltage value vinia of the feedback voltage vfb such that the feedback voltage vfb may be locked to the reference voltage vref fast, the first capacitor C1 may also be used as phase compensation for the second voltage regulator 105a. As such, the circuit area and cost may be reduced.

Next, a voltage generator 100b according to the second embodiment of the disclosure will be described with reference to FIG. 3 and FIG. 4.

Unlike the voltage generator 100a of the first embodiment, the voltage generator 100b of the present embodiment is not provided with the transistor P1 and the initial voltage generator 107a, and a transistor N1 is connected between the third resistor R3 and the ground terminal 100. In addition, an initial voltage generator 107b is connected across the second resistor R2. Since the other components are the same as those of the voltage generator 100a of FIG. 1, the same components are denoted by the same reference numeral, and repeated descriptions shall be omitted as appropriate.

A control terminal of the transistor N1 is connected to an enable signal input terminal 110, one terminal of the transistor N1 is connected to the other terminal of the third resistor R3, and the other terminal of the transistor N1 is connected to the ground terminal 100. In the initial voltage generator 107b, one terminal of the second capacitor C2 is connected to one terminal of the second resistor R2 and the other terminal of the second capacitor C2 is connected to the other terminal of the second resistor R2; one terminal of the first resistor R1 is connected to the other terminal of the second capacitor C2 and the other terminal of the first resistor R1 is connected to one terminal of the third capacitor C3; the other terminal of the third capacitor C3 is connected to the ground terminal 100; the control terminal of the transistor P4 and the control terminal of the transistor N2 are connected to the output terminal of the inverter 109, the other terminal of the transistor P4 is connected to the other terminal of the second capacitor C2, one terminal of the transistor P4 is connected to one terminal of the transistor N2, and the other terminal of the transistor N2 is connected to the ground terminal 100; and one terminal of the first capacitor C1 is connected to one terminal of the transistor N2 and the other terminal of the first capacitor C1 is connected to the ground terminal 100.

The voltage generator 100b of the present embodiment is also the same as the voltage generator 100a of the first embodiment by designing the initial voltage value vinib of the feedback voltage vfb to be close to the reference voltage vref, so as to reduce the settling time of the process of locking the feedback voltage vfb to the reference voltage vref and the magnitude of the overshoot/undershoot voltage which may be generated.

Hereinafter, the operation of the voltage generator 100b configured as above will be described.

Figure 3:
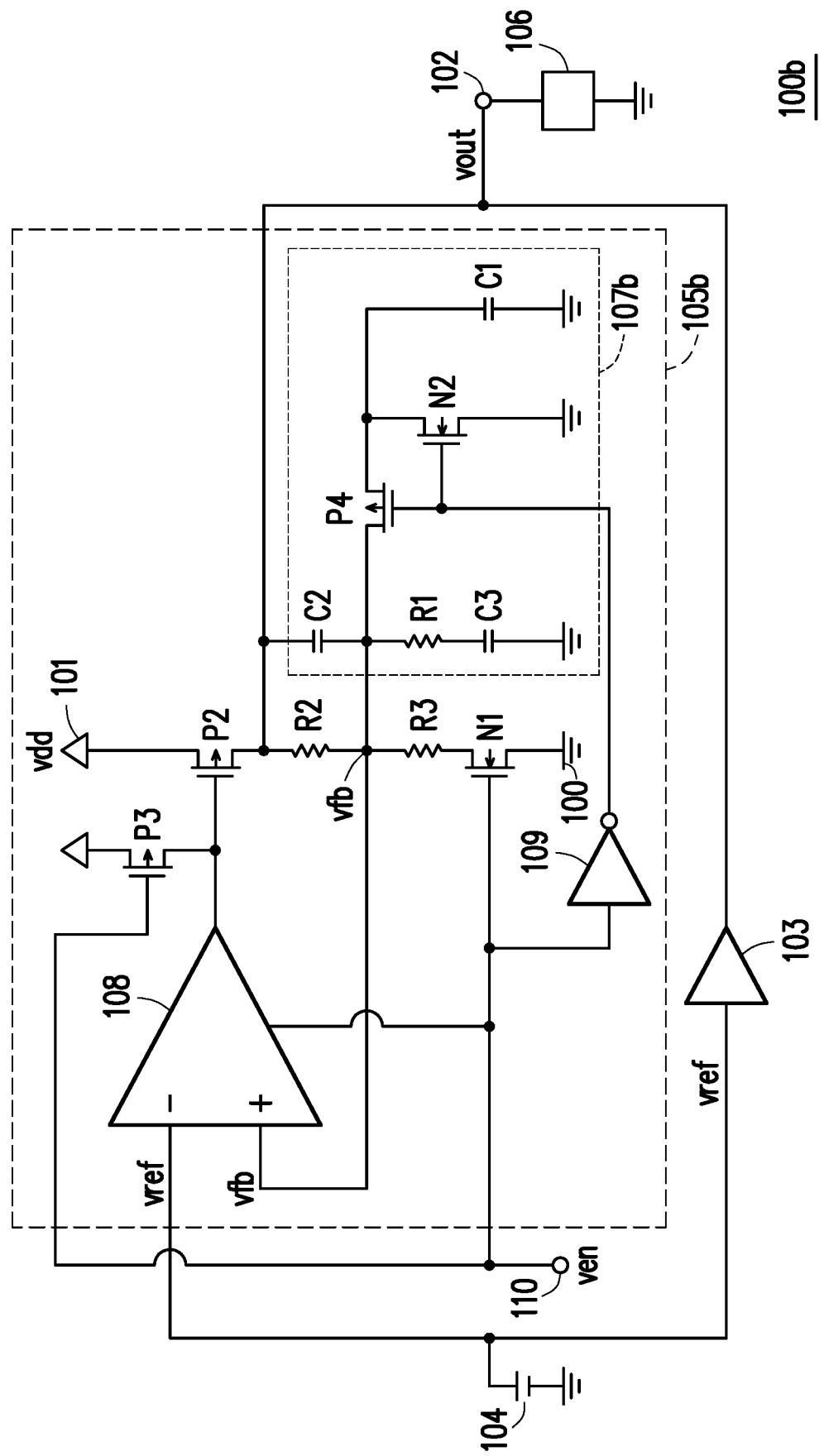
FIG. 3 is a circuit diagram showing the voltage generator according to the second embodiment of the disclosure.
Figure 4:
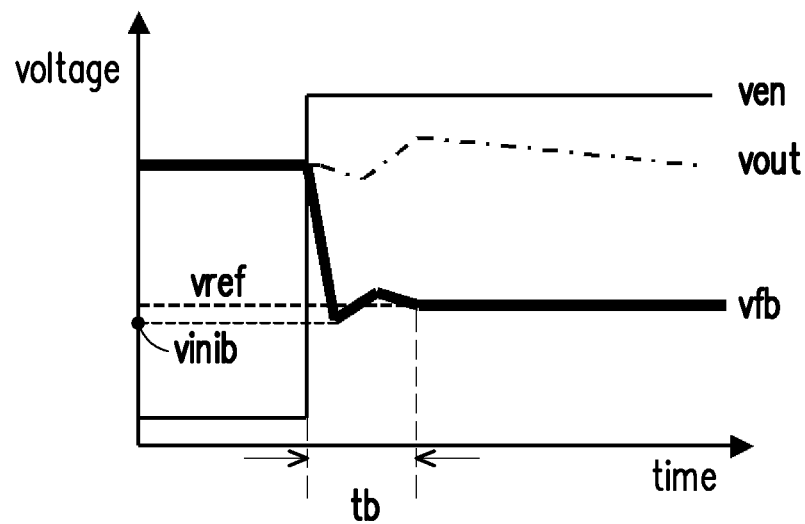
FIG. 4 is a time chart showing respective voltage signals of the voltage generator shown in FIG. 3.
Figure 5:
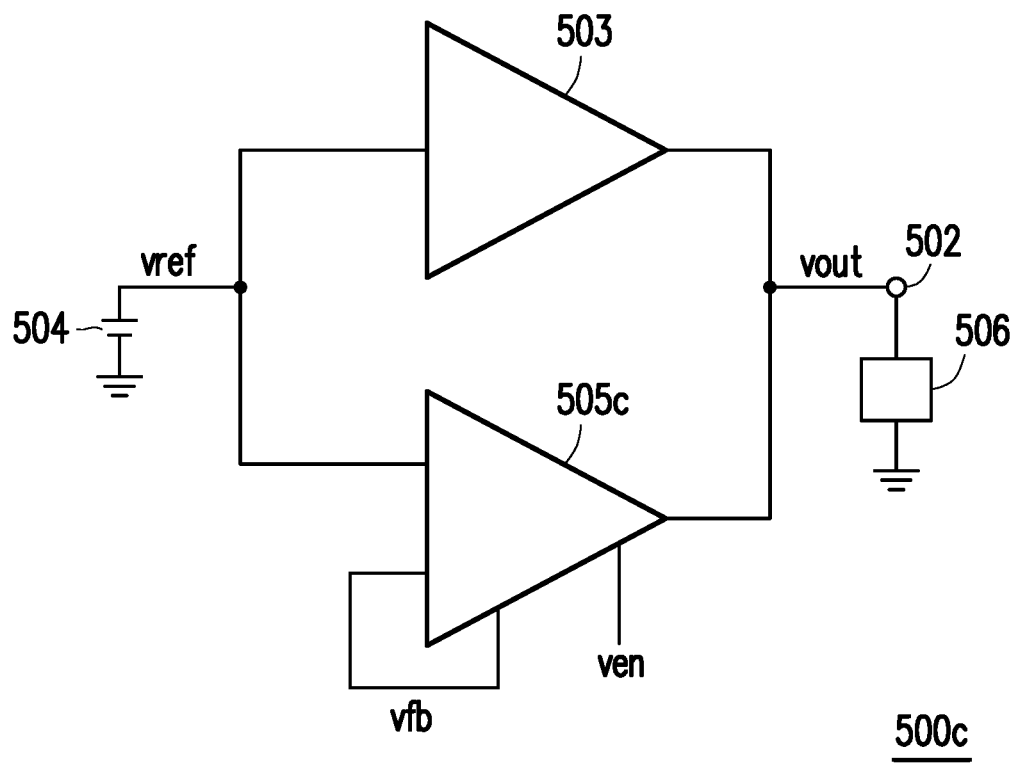
FIG. 5 is a circuit diagram of a conventional voltage generator.
Figure 6:
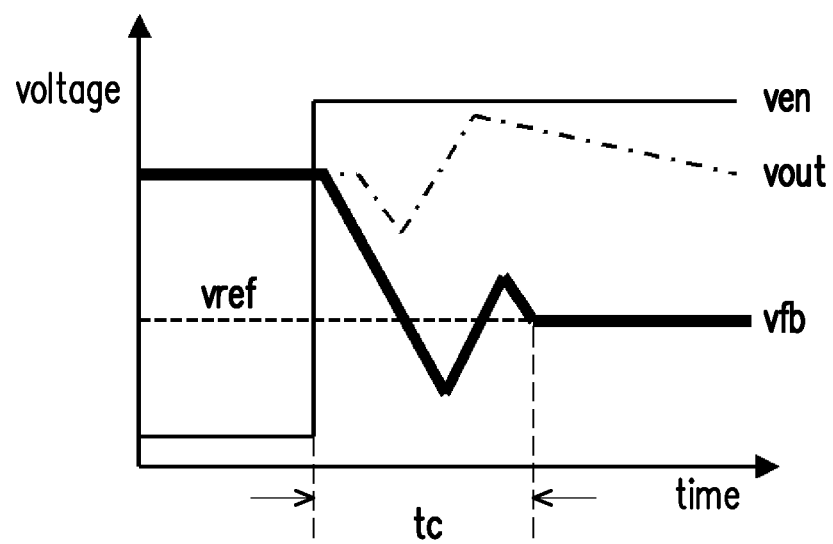
FIG. 6 is a time chart showing respective voltage signals of the voltage generator of FIG. 5.

Referring to FIG. 3 and FIG. 4 at the same time, when the enable signal ven is at a second logic level, that is, an enable mode, the first voltage regulator 103 and the second voltage regulator 105b of the voltage generator 100b may provide an output voltage vout to the load 106 connected to the output terminal 102 according to a reference voltage vref generated by the reference voltage source 104. In order to save power, when the load 106 is operated in a low power consumption mode, the voltage generator 100b may set to a first logic level using the enable signal ven while the second voltage regulator 105b is set to the disable mode, and only the first voltage regulator 103 provides the output voltage vout to the load 106. As such, the standby current of the second voltage regulator 105b may be saved to achieve power saving effect. When the load 106 is operated in a higher power consumption mode, the voltage generator 100b sets to the second logic level using the enable signal ven again to switch the second voltage regulator 105b from the disable mode to the enable mode, such that the first voltage regulator 103 and the second voltage regulator 105b simultaneously provide the output voltage vout to the load 106.

In the embodiment, the voltage generator 100b sets the second voltage regulator 105b to the disable mode using the following method. Firstly, the error amplifier 108 is set to the disable mode, the transistor P3 is turned on, and the transistor N1 is turned off according to the enable signal ven as the first logic level, such that the transistor P2 is turned off due to the increase in the control terminal voltage. No current flows through the second resistor R2 and the third resistor R3 to complete the disable mode setting and achieve power saving effect. It should be noted that when the second voltage regulator 105b is in the disable mode, the first voltage regulator 103 still operates normally, that is, the first voltage regulator 103 still provides the output voltage vout to the load 106. However, at this time, since current does not flow through the second resistor R2 and the third resistor R3, that is, the voltages across the second resistor R2 are equal, the feedback voltage vfb in the disable mode is equal to the output voltage vout.

After the enable signal ven is switched from the first logic level to the second logic level to switch the second voltage regulator 105b from the disable mode to the enable mode, the error amplifier 108 is enabled, the transistor P3 and the transistor N2 are turned off, and the transistor N1 is connected to the transistor P4, such that the error amplifier 108, the transistor P2, and components such as the first resistor R1, the second resistor R2, the third resistor R3, the first capacitor C1, the second capacitor C2, and the third capacitor C3 shown in FIG. 3 relock the feedback voltage vfb from an initial voltage value vinib to the reference voltage vref. A time tb taken for the process from after the enable signal ven is switched from the first logic level to the second logic level to the feedback voltage vfb is locked to the reference voltage vref is known as the settling time, as shown in FIG. 4.

The initial voltage value vinib of the feedback voltage vfb will be analyzed below. When the enable signal ven is at the first logic level (i.e. the disable mode), the transistor P4 is turned off and the transistor N2 is turned on. Therefore, the voltages across respective capacitors in the initial voltage generator 107b are respectively as below. The voltages across the first capacitor C1 are both equal to the ground voltage of ground terminal 100; the voltages across the second capacitor C2 are both equal to the output voltage vout; one terminal of the third capacitor C3 is the output voltage vout and the other terminal is the ground voltage of the ground terminal 100. It can be inferred from the above voltage relationship that both the first capacitor C1 and the second capacitor C2 do not store charge, and the third capacitor C3 stores C3×vout of charge. When the enable signal ven is switched from the first logic level to the second logic level, the transistor P4 is turned on and the transistor N2 is turned off, and the C3×vout of charge stored in the third capacitor C3 is distributed to the first capacitor C1 and the second capacitor C2. At this time, the charge distribution relationship between the first capacitor C1, the second capacitor C2, and the third capacitor C3 can be expressed by Equation (2) as below. It can be inferred from Equation (2) that the initial voltage value vinib of the feedback voltage vfb is inversely proportional to the capacitance value of the first capacitor C1 and proportional to the difference between the capacitance value of the third capacitor C3 and the capacitance value of the second capacitor C2.

$$C3 \times vout = C2 \times (vout - vfb) + C3 \times vfb + C1 \times vfb \quad (2)$$

$$\Rightarrow vfb = vinib = vout \times \frac{C3 - C2}{C1 + C3 - C2} = vout \times \frac{1}{1 + \frac{C1}{C3 - C2}}$$

In addition, it can also be known from Equation (2) that the capacitance values of the first capacitor to the third capacitor C1-C3 are designed such that the initial voltage value vinib of the feedback voltage vfb is close to the reference voltage vref to reduce the settling time and the overshoot/undershoot voltage of the process of locking the feedback voltage vfb to the reference voltage vref. For example, when the reference voltage vref=1 volt (V) and the output voltage vout=3V, the relationship between the capacitance values of the first capacitor to the third capacitor, C1/(C3-C2), may be designed to be substantially equal to 2.

After the enable signal ven is switched from the first logic level to the second logic level, if the initial voltage value vinib of the feedback voltage vfb is a voltage value slightly larger than the reference voltage vref, the error amplifier 108 amplifies the difference between the feedback voltage vfb and the reference voltage vref using the negative feedback design of the second voltage regulator 105b, such that the control terminal voltage of the transistor P2 rises, and the current flowing to the second resistor R2 and the third resistor R3 falls. Therefore, the feedback voltage vfb falls and is gradually locked to the reference voltage vref.

On the contrary, if the initial voltage value vinib of the feedback voltage vfb is a voltage value slightly smaller than the reference voltage vref, the error amplifier 108 amplifies the difference between the feedback voltage vfb and the reference voltage vref using the negative feedback design of the second voltage regulator 105b, such that the control terminal voltage of the transistor P2 falls, and the current flowing to the second resistor R2 and the third resistor R3 rises. Therefore, the feedback voltage vfb rises and is gradually locked to the reference voltage vref.

It is worth mentioning that other than determining the initial voltage value vinib of the feedback voltage vfb such that the feedback voltage vfb may be locked to the reference voltage vref faster, the first capacitor C1 may also be used as phase compensation for the second voltage regulator 105b. Therefore, the circuit area and cost may be reduced.

Based on the above, the initial voltage value of the feedback voltage vfb of the voltage generators 100a and 100b according to the disclosure are close to the reference voltage vref after the disable mode is switched to the enable mode, such that the process of locking the feedback voltage vfb to the reference voltage vref has a shorter settling time and a smaller overshoot/undershoot voltage. Therefore, the voltage generators 100a and 100b in a low power consumption mode are able to have a shorter settling time and a smaller overshoot/undershoot voltage when switched to a higher power consumption mode.

What is claimed is:

1. A voltage generator, comprising:
a first voltage regulator providing an output voltage to an output terminal according to a reference voltage;
a second voltage regulator determining whether to operate in an enable mode or a disable mode according to an enable signal, the second voltage regulator providing the output voltage to the output terminal according to the reference voltage when operating in the enable mode, the second voltage regulator comprising:
an error amplifier amplifying a difference between a feedback voltage based on the output voltage and the reference voltage, and outputting to the output voltage when operating in the enable mode;
a bleeder circuit dividing the output voltage to generate the feedback voltage; and
an initial voltage generator setting an voltage value of the feedback voltage to be at an initial voltage value during an initial time interval after the second voltage regulator switches from the disable mode to the enable mode according to the enable signal, the initial voltage generator comprising a first capacitor, a second capacitor, and a first resistor, wherein the first capacitor, the second capacitor, and the first resistor are connected in series between one terminal of the bleeder circuit and a ground terminal, and the initial voltage value is inversely proportional to a capacitance value of the first capacitor.

2. The voltage generator according to claim 1, wherein the bleeder circuit comprises a second resistor and a third resistor, and the second resistor and the third resistor are connected in series between the output terminal and the ground terminal.

3. The voltage generator according to claim 1, wherein one terminal of the second capacitor is connected to one terminal of the bleeder circuit, another terminal of the second capacitor is connected to one terminal of the first resistor, another terminal of the first resistor is connected to one terminal of the first capacitor, and another terminal of the first capacitor is connected to the ground terminal.

4. The voltage generator according to claim 1, wherein the initial voltage value is further proportional to a capacitance value of the second capacitor.

5. The voltage generator according to claim 1, wherein the initial voltage value is substantially equal to $$vout \times \frac{1}{1 + \frac{C1}{C2}},$$

wherein vout is the output voltage, C1 is the capacitance value of the first capacitor, and C2 is a capacitance value of the second capacitor.

6. A voltage generator, comprising:
a first voltage regulator providing an output voltage to an output terminal according to a reference voltage;
a second voltage regulator determining whether to operate in an enable mode or a disable mode according to an enable signal, the second voltage regulator providing the output voltage to the output terminal according to the reference voltage when operating in the enable mode, the second voltage regulator comprising:
an error amplifier amplifying a difference between a feedback voltage based on the output voltage and the reference voltage, and outputting to the output voltage when operating in the enable mode;
a bleeder circuit dividing the output voltage to generate the feedback voltage; and
an initial voltage generator setting an voltage value of the feedback voltage to be at an initial voltage value during an initial time interval after the second voltage regulator switches from the disable mode to the enable mode according to the enable signal, the initial voltage generator comprising a first capacitor, a second capacitor, a third capacitor, a first transistor, a second transistor, and a first resistor, wherein the second capacitor, the third capacitor, and the first resistor are connected in series between one terminal of the bleeder circuit and a ground terminal, and the first transistor and the second transistor are controlled by the enable signal and couple one terminal of the first capacitor to the ground terminal or the bleeder circuit, and the initial voltage value is inversely proportional to a capacitance value of the first capacitor.

7. The voltage generator according to claim 6, wherein the bleeder circuit comprises a second resistor and a third resistor, and the second resistor and the third resistor are connected in series between the output terminal and the ground terminal.

8. The voltage generator according to claim 6, wherein one terminal of the second capacitor is connected to one terminal of the bleeder circuit, another terminal of the second capacitor is connected to one terminal of the first resistor, another terminal of the first resistor is connected to one terminal of the third capacitor, another terminal of the third capacitor is connected to the ground terminal, one terminal of the first transistor and one terminal of the second transistor are connected to one terminal of the first capacitor, another terminal of the first transistor and another terminal of the first capacitor are connected to the ground terminal, and another terminal of the second transistor is connected to another terminal of the second capacitor.

9. The voltage generator according to claim 6, wherein the initial voltage value is further proportional to a difference between a capacitance value of the third capacitor and a capacitance value of the second capacitor.

10. The voltage generator according to claim 6, wherein the initial voltage value is substantially equal to $$vout \times \frac{1}{1 + \frac{C1}{C3 - C2}},$$

wherein vout is the output voltage, C1 is the capacitance value of the first capacitor, C2 is the capacitance value of the second capacitor, and C3 is the capacitance value of the third capacitor.

* * * * *